United States Patent [19]

Tanikawa et al.

[11] Patent Number: 4,802,018

[45] Date of Patent: Jan. 31, 1989

[54] ELECTRONIC MARKING APPARATUS FOR IDENTIFYING A SELECTED IMAGE FROM A PLURALITY OF ELECTRONICALLY STORED IMAGES

[75] Inventors: Kowji Tanikawa; Tadashi Kato; Masahide Kanno; Hiroyuki Yashima; Akira Matsueda; Takao Rokutan; Hisayuki Harada; Isao Hirosawa; Hiroki Hibino, all of Tokyo, Japan

[73] Assignee: Olympus Optical Co., Ltd., Tokyo, Japan

[21] Appl. No.: 127,586

[22] Filed: Dec. 1, 1987

Related U.S. Application Data

[63] Continuation of Ser. No. 715,657, Mar. 25, 1985, abandoned.

[30] Foreign Application Priority Data

Mar. 29, 1984 [JP] Japan .................................. 59-62050
Mar. 30, 1984 [JP] Japan .................................. 59-62539

[51] Int. Cl.⁴ ........................ G11B 7/00; H04N 5/781
[52] U.S. Cl. ..................................... 358/335; 358/342; 358/906; 358/909; 360/13; 360/35.1
[58] Field of Search ............... 358/335, 342, 906, 909; 360/35.1, 13, 14.1, 14.2, 72.1, 72.2

[56] References Cited

U.S. PATENT DOCUMENTS

| 4,330,186 | 5/1982 | Hattori . | |
|---|---|---|---|
| 4,344,682 | 8/1982 | Hattori . | |
| 4,524,381 | 6/1985 | Konishi | 358/906 X |
| 4,574,319 | 3/1986 | Konishi | 360/35.1 X |

Primary Examiner—Robert L. Richardson
Attorney, Agent, or Firm—Frishauf, Holtz, Goodman & Woodward

[57] ABSTRACT

A marking apparatus has a marking designation switch which is depressed when an image of interest appears on a monitor while a plurality of image data from a photographic unit are displayed on the monitor. In response to a marking designation signal generated upon depression of the marking switch, a mark signal is added to the image data corresponding to the marking designation signal and is stored in a frame memory.

20 Claims, 11 Drawing Sheets

FIG. 16A     FIG. 16B
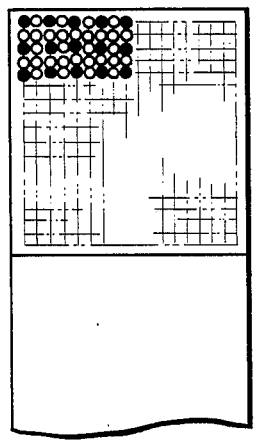 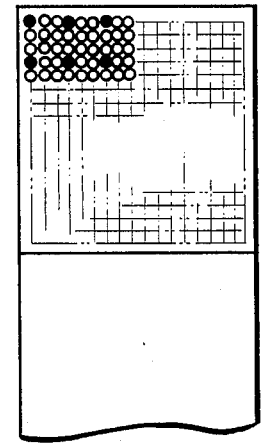
FIG. 18
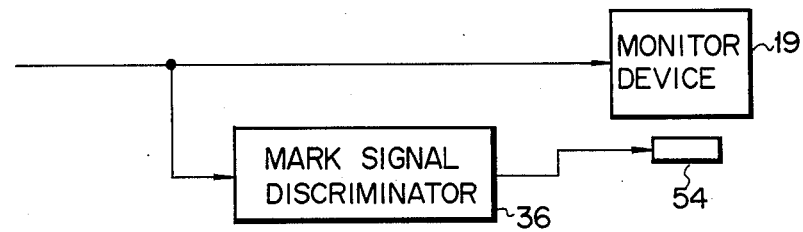
FIG. 19
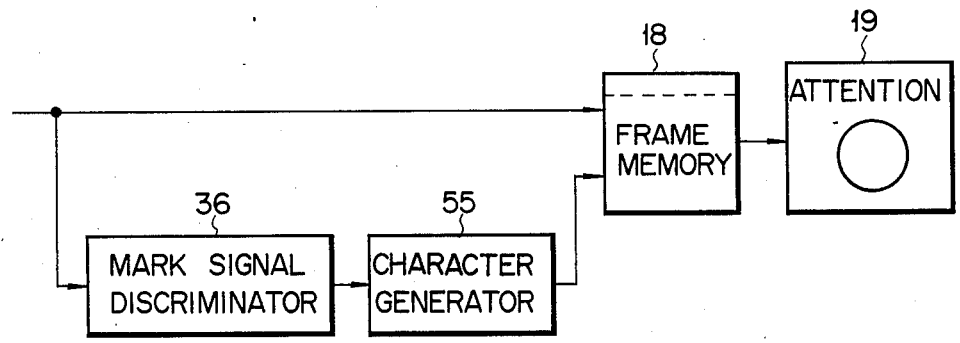

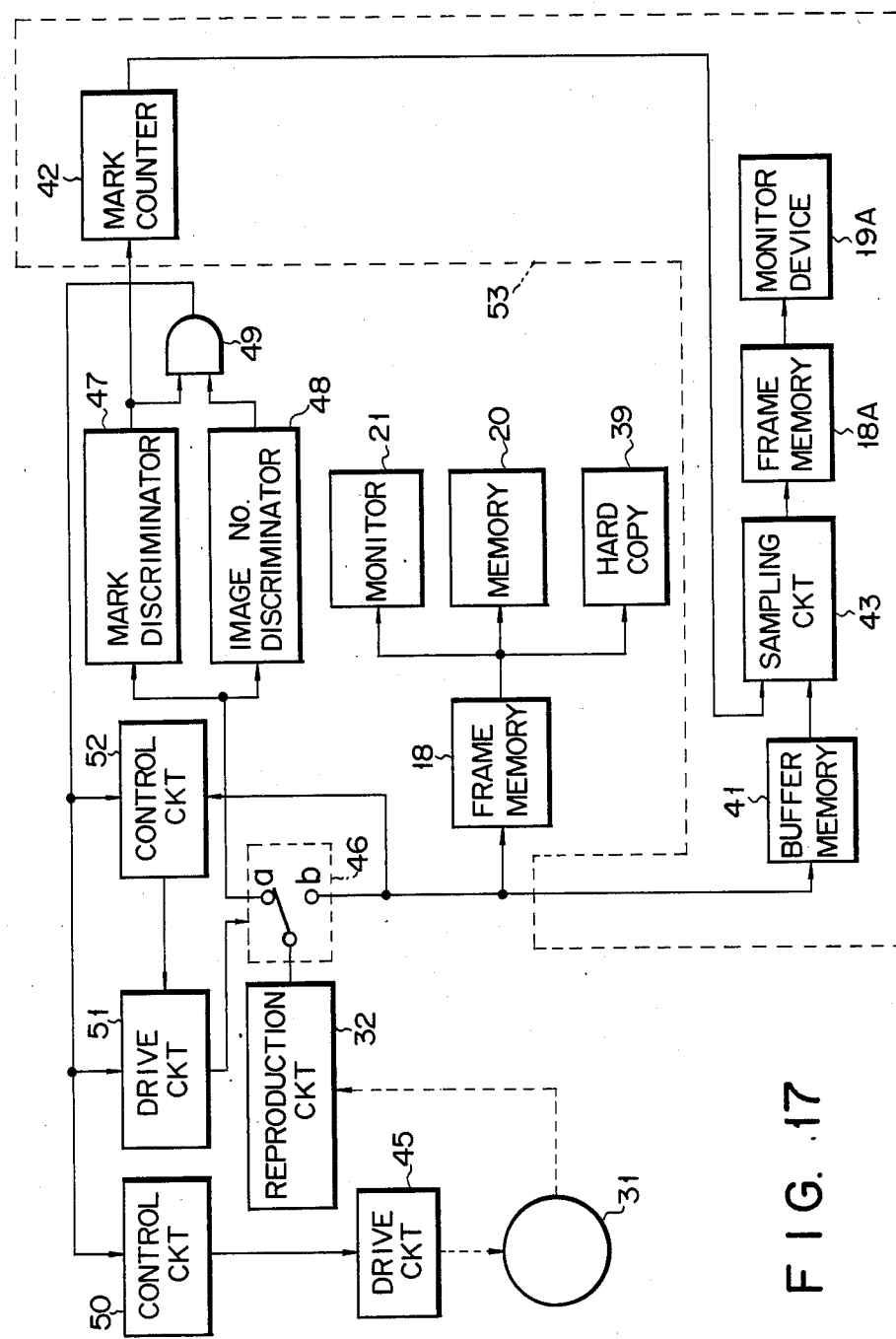
F I G. 17

ELECTRONIC MARKING APPARATUS FOR IDENTIFYING A SELECTED IMAGE FROM A PLURALITY OF ELECTRONICALLY STORED IMAGES

This application is a continuation, of application Ser. No. 715,657, filed Mar. 25, 1985, and now abandoned.

BACKGROUND OF THE INVENTION

The present invention relates to an image marking apparatus for marking image data or image information.

Image data is widely utilized in medical diagnosis. Particularly, endoscopic diagnosis is based on image data. In endoscopy, an endoscopic image of an object is photographed and the obtained photograph is used for diagnosis. In order to allow complete diagnosis, all details of an object portion of interest are photographed. For this reason, more pictures than necessary are taken. Pictures necessary for diagnosis are selected from a large number of pictures and diagnosis is made based on the selected pictures. This process results in a time-consuming diagnosis and involves complex management and storage of pictures.

SUMMARY OF THE INVENTION

It is an object of the present invention to provide an image data marking apparatus for marking image data to allow easy selection of a desired image.

In order to achieve the above object of the present invention, there is provided an image data marking apparatus having a marking data generator for generating marking data in accordance with the degree of importance of images photographed by a photographic device, and a memory circuit for recording image data together with the marking data.

There is also provided according to the present invention an image data marking apparatus having a discrimination circuit for discriminating marking data from image data selectively including the marking data, and a reproduction circuit for reproducing image data corresponding to the marking data discriminated by the discrimination circuit.

BRIEF DESCRIPTION OF THE DRAWINGS

FIGS. 16A and 16B are a representation showing the bit pattern of a buffer memory included in the circuit shown in FIG. 12;

FIG. 17 is a block diagram showing a circuit for reproducing marking data stored in a directory area;

FIG. 18 is a block diagram of a signal processing circuit for displaying a marked image together with marks and a non-marked image; and FIG. 19 is a block diagram of a circuit for displaying marked data together with characters.

DETAILED DESCRIPTION OF THE PREFERRED EMBODIMENTS

Figure 1:
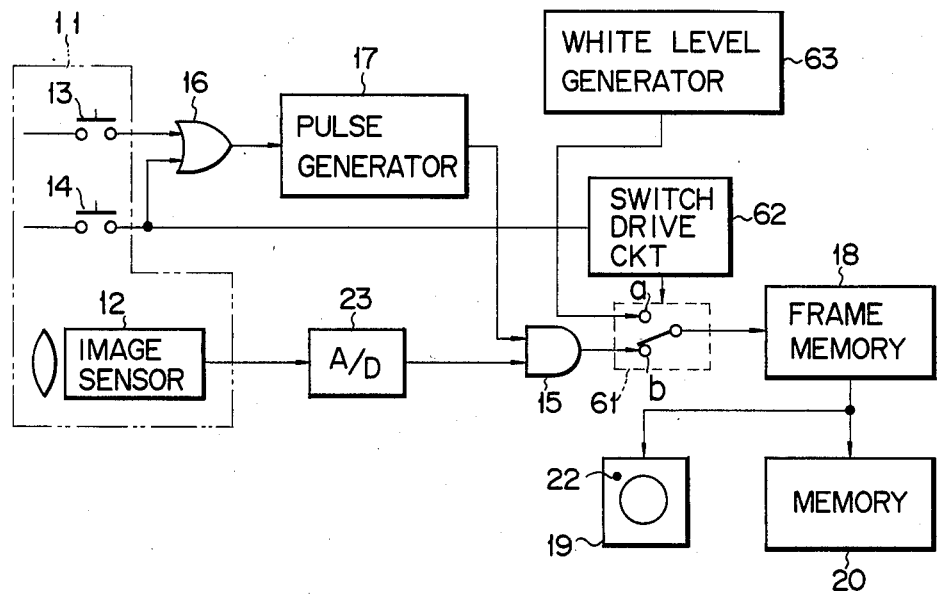
FIG. 1 is a block circuit diagram of a marking apparatus according to an embodiment of the present invention.

FIG. 1 shows an embodiment of the present invention. A photographic section 11 is an image pick-up device (e.g., a TV camera or an electronic still camera) mounted on an endoscope. The photographic section 11 has an image sensor 12 for converting optical images into image signals, a release switch 13 and a marking switch 14. An output from the image sensor 12 is supplied to one input terminal of an AND gate 15 through an A/D converter 23. Output side contacts of the release switch 13 and the marking switch 14 are connected to input terminals of an OR gate 16. The output terminal of the OR gate 16 is coupled to a pulse generator 17. The output terminal of the pulse generator 17 is connected to the other input terminal of the AND gate 15. The output terminal of the AND gate 15 is connected to one input terminal of a switch circuit 61. The output side contact of the marking switch 14 is also connected to a switch drive circuit 62. The output terminal of the switch circuit 6 is connected to a frame memory 18. The other input terminal of the switch circuit 61 is connected to a white level generator 63. The output terminal of the frame memory 18 is connected to a display or monitor 19 and a recording memory 20. The monitor 19 includes an A/D converter, a video signal generator, and a CRT.

Figure 2:
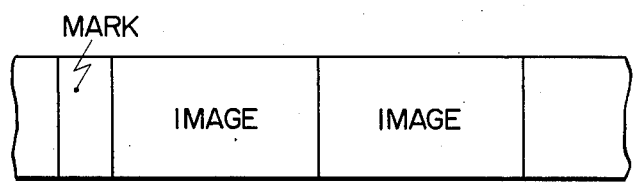
FIG. 2 shows the recording format of the memory.

In the marking apparatus of the configuration described above, when the release button 13 is depressed while viewing an endoscopic image through the viewfinder of the electronic camera 11 (FIG. 1), a release signal (high level pulse) is supplied to the pulse generator 17 through the OR gate 16. In response to the release signal, the pulse generator 17 generates a pulse of a duration corresponding to one frame. When this frame pulse is supplied to the AND gate 15, an image signal of one frame from the image sensor 12 is stored in the frame memory 18 through the A/D converter 23, the AND gate 15, and the contact b of the switch circuit 61. In this case, the frame pulse is generated from the pulse generator 17 in synchronism with the sync signal. When image data stored in the frame memory 18 is read out and supplied to the monitor 19, an endoscopic image 21 is displayed. When the image data in the frame memory 18 is supplied to a disk memory 20, it is stored in the memory 20. When a viewer e.g., doctor finds an important portion, e.g., a diseased portion during watching and judges to require marking, the marking switch 14 is depressed. Then, a pulse signal is supplied to the pulse generator 17 through the OR gate 16 and supplied to the switch drive circuit 62. In response to the pulse signal, the switch drive circuit 62 supplies a switch drive pulse of a predetermined pulse duration to the switch circuit 61. In response to the drive pulse, the switch circuit 61 is switched to the side of the contact a for a predetermined period of time, i.e., for a time duration corresponding to the pulse width. During this time period, a white level signal is supplied from the white level generator 63 to the frame memory 18 through the switch circuit 61 as a mark signal. The mark signal is stored in the frame memory 18 as mark data. When the switch circuit 61 is switched to the side of the contact b, the image data is supplied to the frame memory 18 and is stored in the first picture element region of the frame memory and immediately following the mark data as shown in FIG. 2.

On the one hand, in response to the marking pulse signal, the pulse generator 17 generates a pulse corresponding to one frame. When the pulse is supplied to the AND gate 15, an image signal of one frame is supplied to the frame memory 18 and stored immediately after the marking data. When the data of the frame memory 18 is supplied to the monitor 19, an endoscopic image 21 and a mark 22 are displayed on the monitor 19.

When the marking switch 14 is depressed in this manner, the image data is stored in the frame memory 18 together with the marking data. When the data in the frame memory 18 is transferred to the disk memory 20 the marked image data or non-marked image data are sequentially stored therein. When the image data is sequentially read out from the disk memory 20 together with the marking data and supplied to the monitor 19, a marked image or non-marked image is displayed on the monitor 19. By paying attention to marking, an operator, for example, a doctor can easily observe an image necessary for diagnosis. Unnecessary images displayed as non-marked images can therefore be easily erased.

The image data in the frame memory 18 or the disk memory 20 can be supplied to a video printer and printed out as a hard copy.

Figure 3:
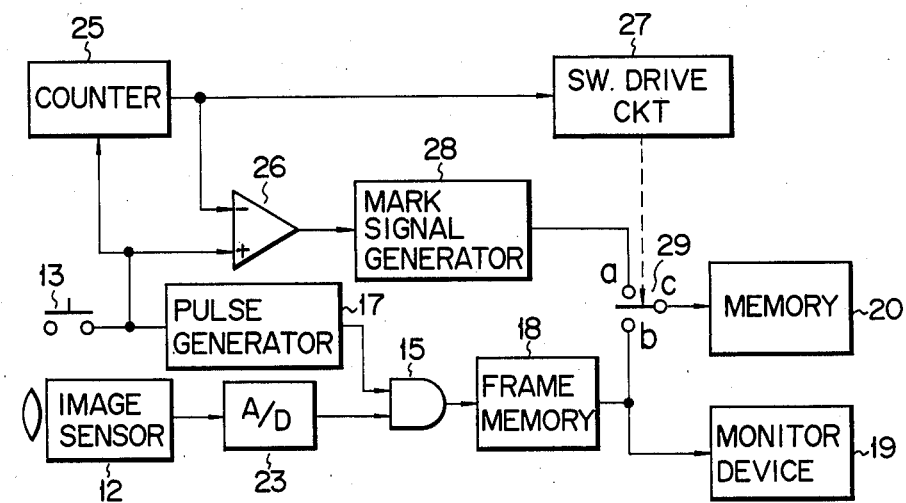
FIG. 3 is a block circuit diagram of an image data marking apparatus according to another embodiment of the present invention.

According to an embodiment shown in FIG. 3, the output side contact of the release switch 13 is directly connected to the pulse generator 17, to the set terminal of a down counter 25 (T-sec. preset time) and to the non-inverting input terminal of a comparator 26. The output terminal of the counter 25 is connected to the inverting input terminal of the comparator 26 and to a switch circuit 27. The output terminal of the comparator 26 is connected to a mark signal generator 28. The output terminal of the mark generator 28 is connected to contact a of a switch 29. The read terminal of the frame memory 18 is connected to contact b of the switch 29. Contact c of the switch 29 is connected to a disk memory 20.

Figure 4:
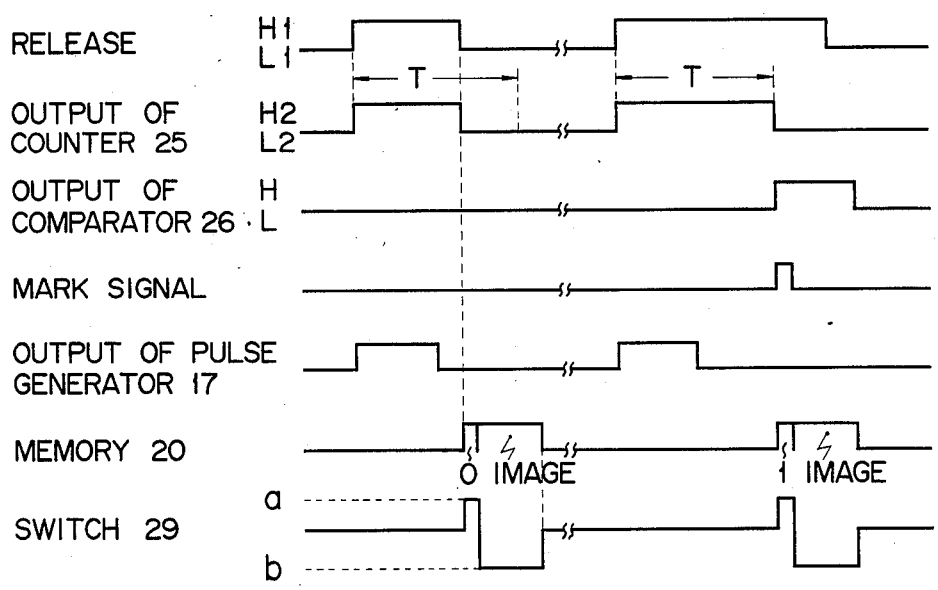
FIG. 4 is a timing chart for explaining the mode of operation of the circuit shown in FIG. 3.

The mode of operation of the embodiment shown in FIG. 3 will be described with reference to the timing chart shown in FIG. 4. When the release switch 13 is depressed, the pulse generator 17 generates pulses of one frame, and the counter 25 is set to start counting down. In response to the pulses from the pulse generator 17, an image signal of one frame is supplied to and stored in the frame memory 18 through an A/D converter 23 and an AND gate 15. In response to the release signal, the counter 25 goes from L2 level to H2 level. In T seconds after the release signal goes from H1 level to L1 level, the counter 25 is reset to L2 level. At this time, the output from the comparator 26 is at L level, and the mark signal from the mark signal generator 28 is at L level. In response to the trailing edge of the output from the counter 25, the switch circuit 27 changes the mode of the switch 29 in the order of the contact a, contact b and off. When the switch 29 is connected to the side of the contact a, a mark signal "0" is stored in the disk memory 20. When the switch 29 is switched to the side of the contact b, image data from the frame memory 18 is stored immediately after the mark signal "0" in the memory 20.

When an image of an object portion of interest is observed during diagnosis, the release switch 13 is depressed for longer than T seconds. In this case, the counter 25 is reset and goes to L2 level after counting T seconds. Therefore, the output from the comparator 26 goes to H level, and the mark signal generator 28 generates a mark signal of level "1". At this time, in response to the trailing edge of the counter output, the switch circuit 27 connects the mode of the switch 29 in the order of contact a, contact b and off. Therefore, the image data and the mark signal 1 are sequentially stored in the memory 20.

When the mark and image data stored in the disk memory 20 in this manner are read out and supplied to a monitor 19, mark and image data are displayed on the monitor 19. In this case, when the mark data is "0", a mark image is not displayed. When the mark data is "1", a mark image is displayed with the endoscopic image. The mark data may be displayed as different mark images. Furthermore, mark data can be displayed immediately after image data. A mark signal can be a low-frequency signal and superimposed on an image signal. A separate directory tracks for storing only mark signals can also be provided.

Figure 5:
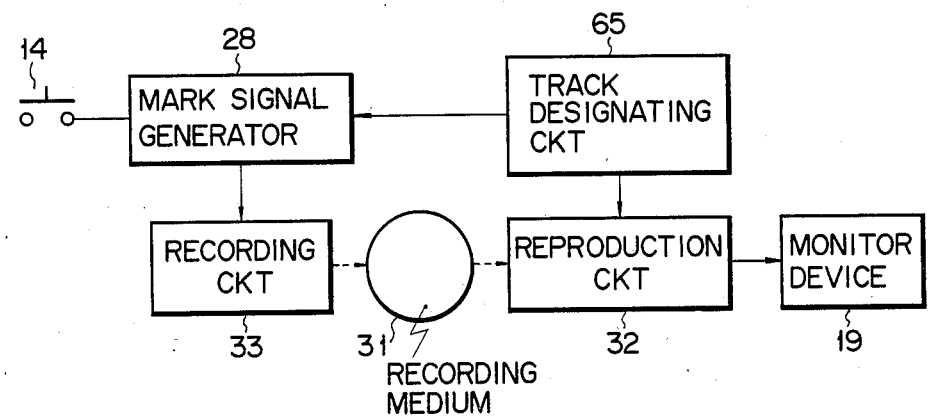
FIG. 5 is a block circuit diagram showing a marking apparatus for marking image data during reproduction according to still another embodiment of the present invention.

In another embodiment shown in FIG. 5, image data stored in a recording medium 31 such as a magnetic disk can be marked while it is being reproduced and displayed.

A track No. designation circuit 65 is arranged for designating a track No. The track No. designation circuit 65 allows designation of a track No. by depressing a track No. designation key (not shown). Track No. data entered in this manner is supplied to a mark signal generator 28 and a reproduction circuit 32. The reproduction circuit 32 is operated to reproduce image data of a designated track No. from the recording medium. A reproduced image of a designated track No. is displayed on the monitor 19. When a desired image is displayed on the display screen of the monitor 19, the operator depresses a marking switch 14. Then, the mark signal generator 28 supplies input track No. data and a mark signal to a recording circuit 33. The recording circuit 33 records the mark signal on the directory track of the recording disk 31 which corresponds to the image displayed on the monitor 19. Thus, image data which has been already recorded can be marked.

Figure 6:
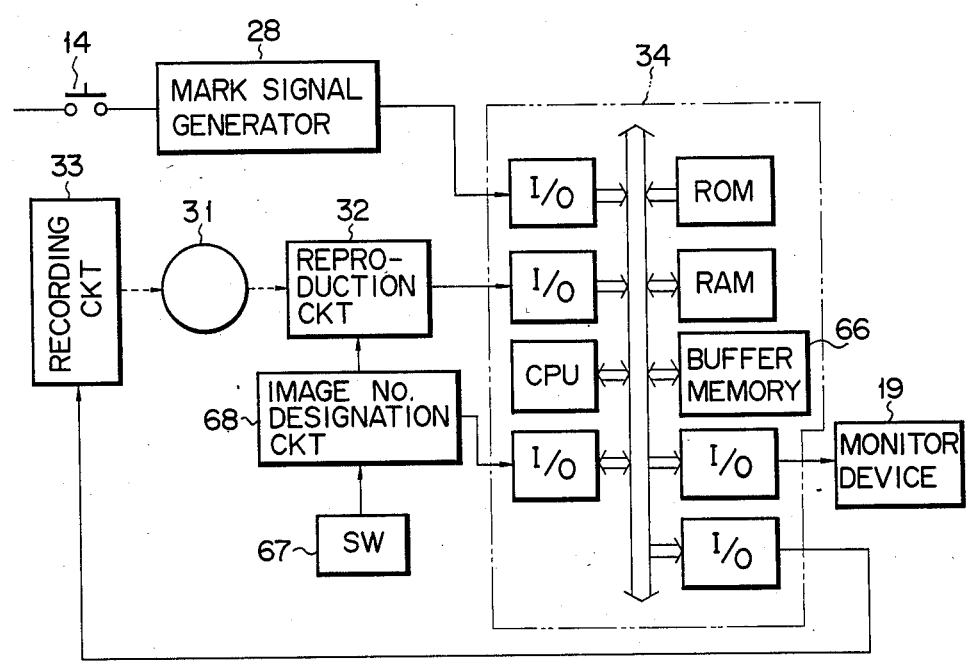
FIG. 6 is a circuit diagram of a marking apparatus for marking in a buffer memory according to still another embodiment of the present invention.

According to still another embodiment shown in FIG. 6, a mark signal generator 28, a reproduction circuit 32 and an image No. designation circuit 68 are connected to a buffer device 34. The buffer device 34 has an I/O circuit, a CPU, a ROM, a RAM and a buffer memory 66.

A switch 67 connected to the image No. designation circuit 68 is arranged to designate an image No. When an image No. is designated by the switch 67, an image No. designation circuit 68 supplies track No. data corresponding to a designated image No. to the reproduction circuit 32 and the buffer device 34. The reproduction circuit 32 reproduces image data corresponding to track No. data from a recording disk 31, and transfers it to the buffer device 34. The CPU of the buffer device 34 transfers input image data to the buffer memory 66 and stores it therein. Image data stored in the buffer memory 66 is read out at a predetermined timing and is supplied to a monitor 19. The D/A converter included in the monitor 19 converts the image data into an analog signal. The video signal generator of the monitor 19 adds a sync signal to the analog signal and supplies a resultant monitor signal to the monitor CRT. When it is judged that an image displayed on the monitor 19 should be marked, the marking switch 14 is depressed. In response to depression of the switch 14, the mark signal generator 28 supplies a mark signal to the buffer device 34. The CPU of the buffer device causes the mark signal to be stored in an address of the buffer memory 66 which corresponds to the endoscopic image presently displayed. When the mark signal is recorded, the image data, the image No. and the mark signal stored in the buffer memory 66 are transferred to the recording circuit 33. The recording circuit 33 records the image data, the image No., and the mark signal on the corresponding recording track on the recording disk 31.

Figure 7:
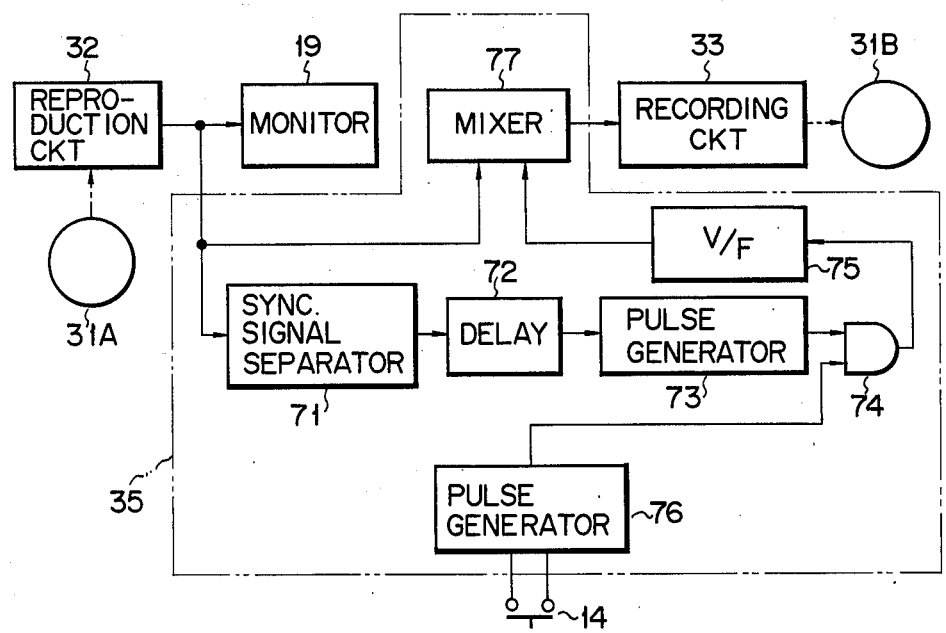
FIG. 7 is a block diagram of a marking apparatus for marking during transfer of image data from a small-memory capacity to a large-capacity memory according to still another embodiment of the present invention.

In an embodiment shown in FIG. 7, marking is performed when, for example, image data is transferred from a small-capacity recording medium 31A storing image data of one patient to a large-capacity recording medium 31B storing image data, clinical chart data and the like of a number of patients.

Figure 8:
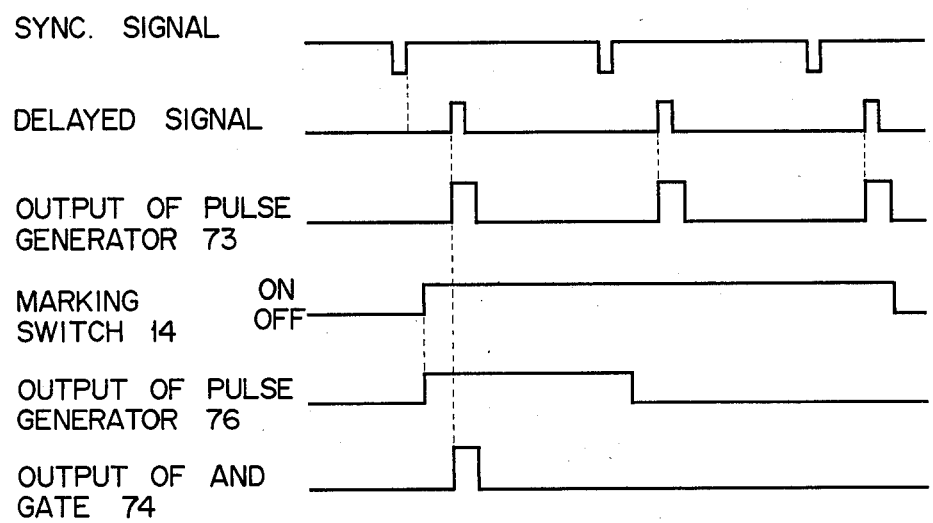
FIG. 8 is a timing chart of signals at the respective parts of the circuit of the apparatus shown in FIG. 7 for explaining the mode of operation thereof.

In this embodiment, image data reproduced from any track of the disk 31A is supplied to a monitor 19 and a marking circuit 35. A reproduced image is displayed on the monitor 19. The marking circuit 35 separates a sync signal from the reproduced image data by a sync signal separator 71. The separated sync signal is shown in FIG. 8. The sync signal is delayed by a delay circuit 72 by a predetermined time, and the delayed signal is supplied to a pulse generator 73. In response to the delayed input signal, the pulse generator 73 generates a pulse of a predetermined level (5 V). In this state, an image to be marked is displayed on the monitor 19. When a marking switch 14 is depressed, a pulse generator 76 responds to the marking switch signal and supplies a pulse signal of a pulse width corresponding to one frame to an AND gate 74. The AND gate 74 supplies a pulse from the pulse generator 73 to a V/F converter 75. The V/F converter 75 converts an output pulse of the AND gate 74 into a frequency signal which is supplied to a mixer 77. Since image data is supplied to the mixer 77, the frequency signal is superimposed as a mark signal on the image data. When an output signal from the mixer 77, i.e., a composite signal of the image data and the mark signal is supplied to the recording circuit 33, it is recorded on the large-capacity recording disk 31B.

Figure 9:
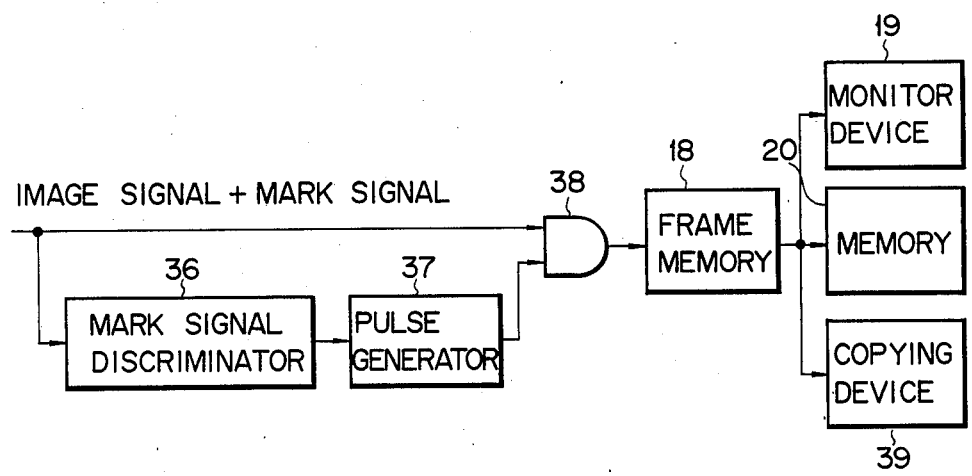
FIG. 9 is a block diagram of an apparatus for reproducing only marked image data.
Figure 10:
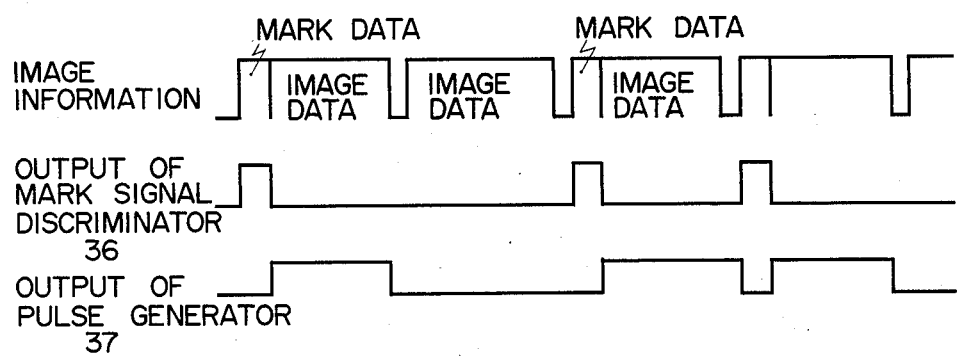
FIG. 10 is a timing chart for explaining the mode of operation of the circuit shown in FIG. 9.

In the circuit shown in FIG. 9, only marked image data is printed from the image data reproduced from a recording medium. More specifically, when marked and non-marked image data shown in FIG. 10 are supplied, a mark signal discrimination circuit 36 monitors a mark signal. Upon detection of a mark signal, the circuit 36 supplies a signal to a pulse generator 37. The pulse generator 37 produces a pulse signal of one frame in response to an output signal from the mark signal discrimination circuit 36. When the pulse signal is supplied to an AND gate 38, marked image data of one frame is recorded in a frame memory 18. Marked image data stored in the frame memory 18 is selectively supplied to a monitor 19, a disk memory 20 and a hard copy machine 39 to be displayed, recorded or subjected to production of a hard copy.

Figure 11:
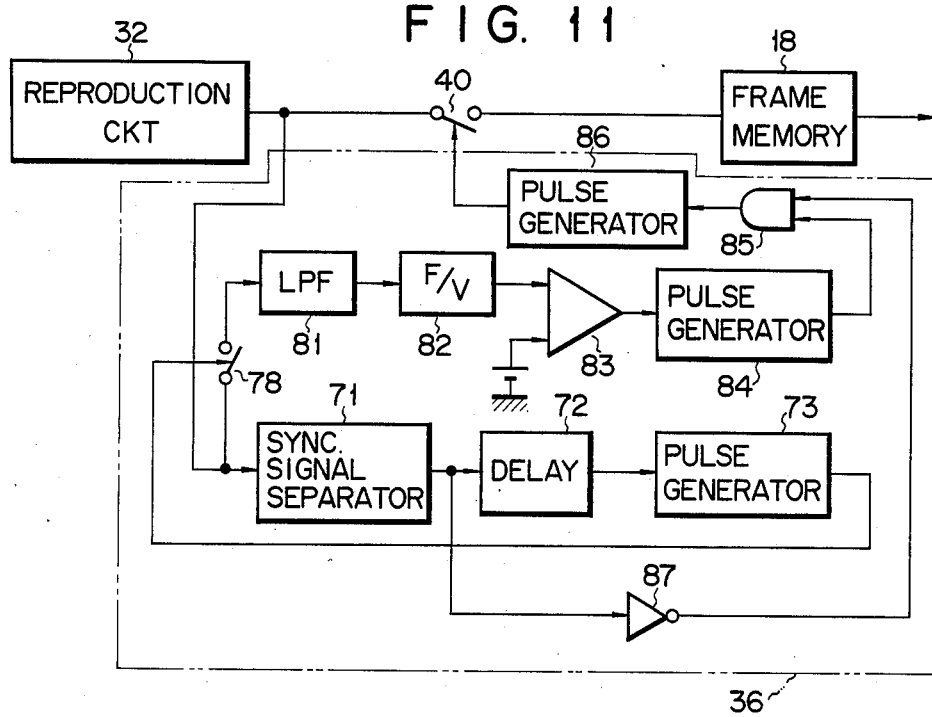
FIG. 11 is a block diagram of a circuit for processing marking data recorded by low-frequency multiplexing.
Figure 12:
FIG. 12 is a timing chart for explaining the mode of operation of the circuit shown in FIG. 10.

In an embodiment shown in FIG. 11, signal processing is performed for a case wherein a mark signal is low-frequency multiplexed on an image signal. In this case, image data recorded in a recording disk is reproduced by a reproduction circuit 32. When the reproduced image data is supplied to a sync signal separator 71, the sync signal shown in FIG. 12 is supplied to a delay circuit 72. A pulse generator 73 generates a pulse of a predetermined pulse width in response to a delayed output signal from the delay circuit 72. A switch 78 is turned on by the pulse from the pulse generator 73. Image data is supplied to an LPF 81 together with the multiplex-recorded mark signal through the switch 78. A signal from the LPF 81 is converted into a voltage signal by an F/V converter 82 and the voltage signal is supplied to a comparator 83. In response to the mark signal, the comparator 83 generates a signal of high level. When this signal of high level is supplied to a pulse generator 84, the pulse generator 84 supplies a pulse of a pulse width corresponding to one frame to an AND gate 85. Since a sync signal is supplied to the other input terminal of the AND gate 85 through an inverter 87, the AND gate 84 supplies an AND signal to a pulse generator 86. In response to the AND signal, the pulse generator 86 supplies a drive pulse to a switch 40 to close it. At this time, image data of one frame is supplied to a frame memory 18 and stored therein. In this manner, only marked image data is stored in the frame memory 18.

Figure 13:
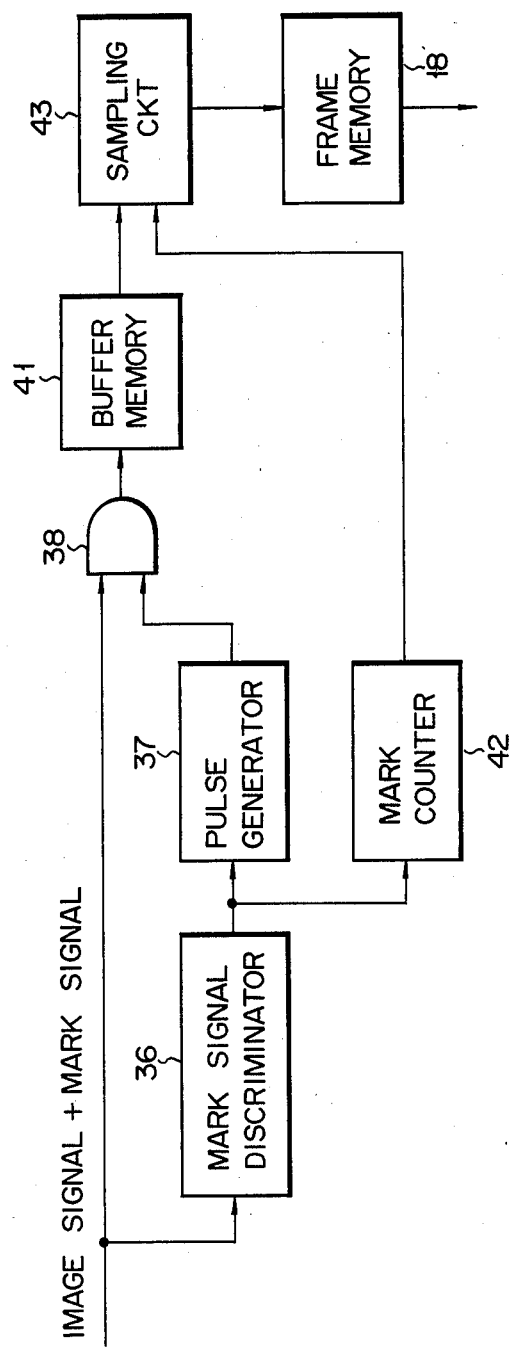
FIG. 13 is a block diagram of a signal processing circuit for performing multi-display of marked image data.

In an embodiment shown in FIG. 13, a plurality of image data pieces are recorded as one-frame data so as to allow display of a plurality of images at the same time.

In this case, only marked image data is sequentially stored in a buffer memory 41 and stored therein. A mark signal is counted by a mark counter 42. When a predetermined amount of image data is stored in the buffer memory 41, it is sampled by a sampling circuit 43. The sampling circuit 43 samples the image data in accordance with the count of the mark counter 42 and converts the data into one-frame image data.

Sampling by the sampling circuit 43 will be described with reference to the flow chart shown in FIG. 14. At the start of the sequence flow, it is checked if a count c of the mark counter 42 has been entered. When YES, it is checked if c=1. If NO, n which satisfies $n-1 \leq \sqrt{c} \leq n$ is determined. When the value of n is determined, the interval, during which the pixels of the image data stored in a buffer memory 41 are readout, is decided at a value of 1/n in the horizontal and vertical directions. When n=2, for example, the interval is decided at such value that every other pixel is read out from the buffer memory. Similarly, when n=3, the interval is decided such value that every third pixel is read out. The number (PH) of horizontal divisions of a frame memory 18 is decided at a value of n. Next, it is checked if $c \leq (n-1) \times n$. If YES, the number (PV) of vertical divisions of the frame memory 18 is decided at a value of (n−1). However, if NO, the number (PV) of vertical divisions of the frame memory 18 is decided at a value of n. Thereafter, the image data sampled from the buffer memory 41 is stored in the frame memory 18.

Figure 15A:
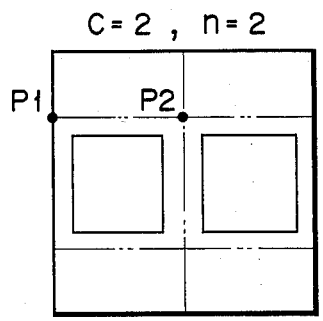
FIGS. 15A to 15E show representations for explaining multi-display of image data.
Figure 15B:
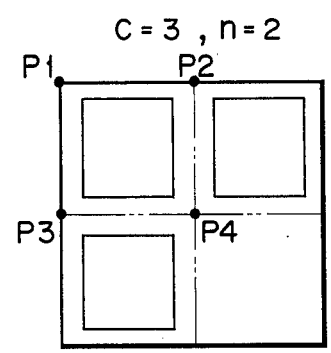
Figure 15C:
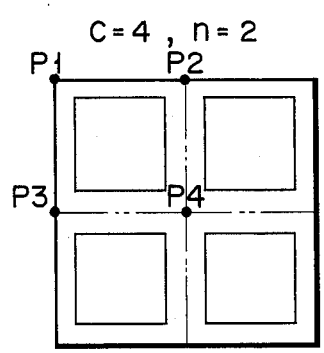
Figure 15D:
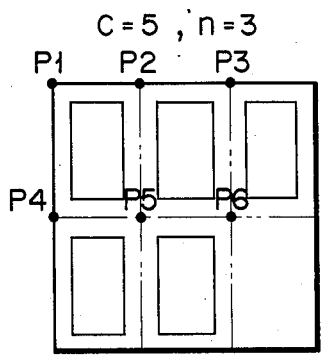
Figure 15E:
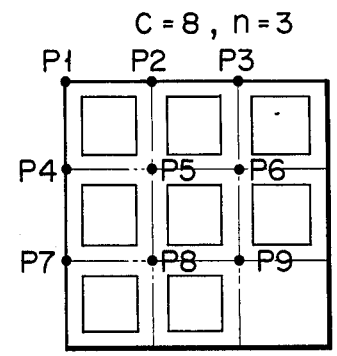

Writing in the frame memory 18 is performed by subroutine. At the start of the subroutine, the address calculation of a target pointer is performed in accordance with a vertical division number PV and a horizontal division number PH under controlling of the CPU of the sampling circuit 43. That is, the memory region of the sampling circuit 43 stores the numbers PH and PV of horizontal and vertical divisions and the address of the target pointer corresponding to the PH and PV so that if the values of the PH and PV are decided, the address of the target pointer can be determined. When PH=2 and PV=1 or C=2, the addresses of the target pointers P1 and P2 are decided as shown in FIG. 15A. When PH=2 and PV=2 or C=3 or 4, the addresses of the target pointers P1, P2, P3, and P4 are decided as shown in FIGS. 15B and 15C. When PH=3 and PV=2 or C=5 or 6, the addresses of the pointers P1 to P6 are decided as shown in FIG. 15D. Similarly, the addresses of the target pointers are determined by the values of PH and PV, as shown in, for example, FIG. 15E. After L is reset to 0, it is incremented by one (L=L+1). Then, it is checked if L≦c. If YES, the address of a target pointer PL is set at the address obtained by the above address computation. Thereafter, the image of B=L is read out from the buffer memory 41 with the pixels being removed by every 1/n. The pixel data readout so are written in the frame memory 18 from the target pointer PL as shown in FIGS. 15A to 15E. When B=1, i.e., PL=P1, the pixel data are written in the frame memory 18 from the target pointer P1 to the pointer P2 in a horizontal direction. When the pixel data are written in the pointer P2, the pixel data are written in from the address of the pointer immediately under the pointer P1 to the address of the pointer immediately under the pointer P2 in the horizontal direction. In such a way, the pixel data are written in the frame memory 18 until the image information of B=1 is completely readout from the buffer memory 41. When readout of the image is completed, L is incremented by one again. Thereafter, the same process is repeated until L≦c.

Figure 14:
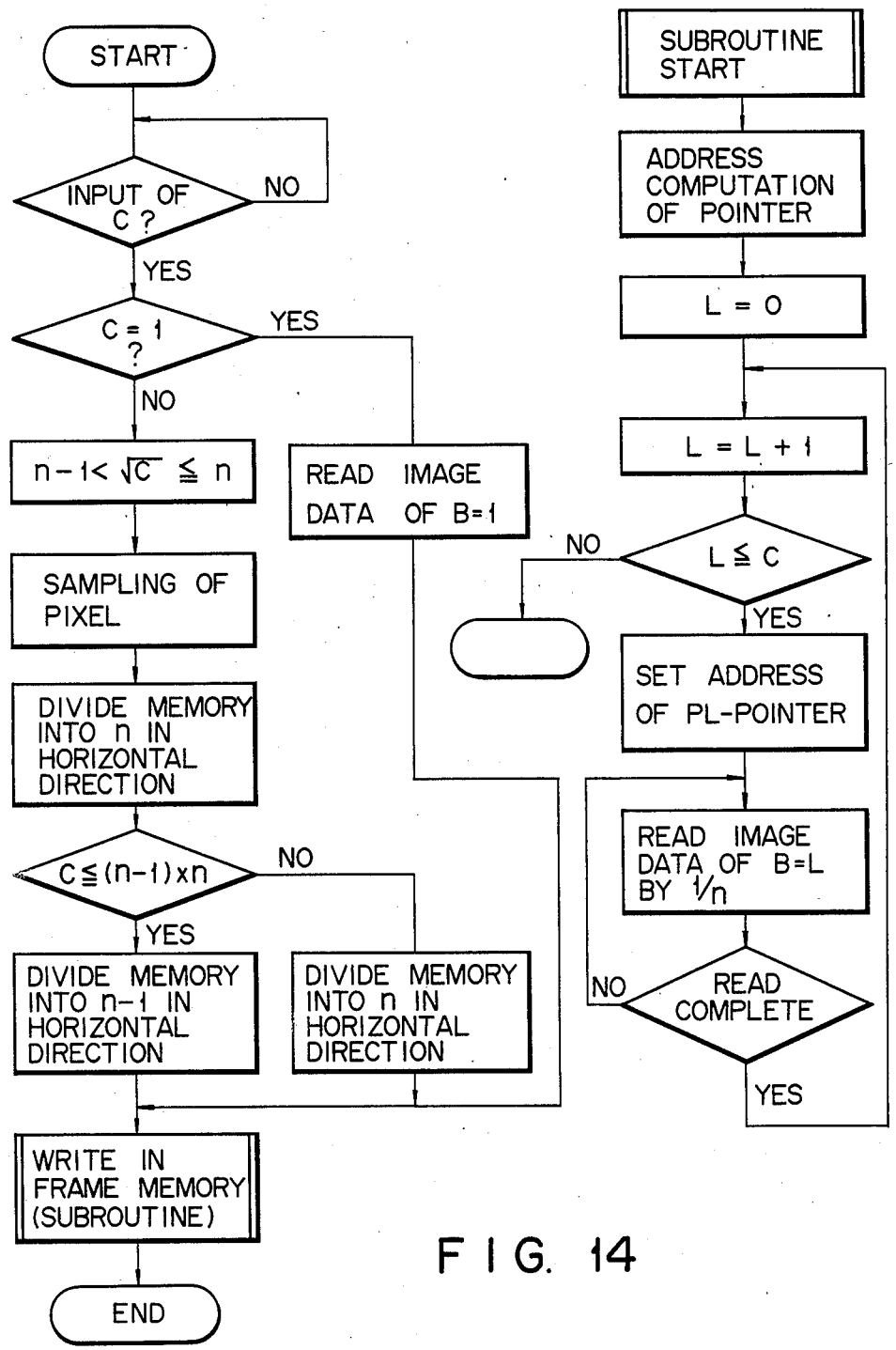
FIG. 14 is a flow chart for explaining the mode of operation of the circuit shown in FIG. 12.

FIGS. 15A to 15E show the pattern of image data which is stored in the frame memory in accordance with the flow shown in FIG. 14 by changing the values of n and c. FIGS. 16A and 16B show the sampling states of pixels from the buffer memory when n=2 and n=3. The black points show the pixels to be readout.

FIG. 17 shows still another embodiment wherein marking data is stored in a directory (DIR) region of a disk. In this embodiment, when the power source is turned on, the magnetic head is moved to the DIR track by a drive circuit 45 so as to reproduce the information therefrom. The reproduced information is supplied to a mark discrimination circuit 47 and a picture No. discrimination circuit 48 through a reproduction circuit 32 and a switch 46. The reproduced information includes the pixel number data and mark data. The DIR data is read out from those of smaller numbers. The mark discrimination circuit 47 judges whether the mark is present or not in the reproduced information. When the mark discrimination circuit 47 detects the mark, it outputs at a predetermined timing a high level pulse having a predetermined pulse width. The picture No. discrimination circuit 48 discriminates the picture number from the DIR information and outputs a picture number digital information at the same timing as the high level pulse of the mark discrimination circuit 47. Thus, the picture number data corresponding to the marked endoscopic image is outputted from the AND gate 49. If the mark discrimination circuit 47 judges the non-marked information, the AND gate 49 does not output the picture number data. In response to the picture No. data, the drive circuit 45 controlled by a control circuit 50 moves the magnetic head to a corresponding track and a switch drive circuit 51 switches the switch 46 to the side of the contact b. As a result, predetermined image data corresponding to the picture No. is stored in a frame memory 18. When image data of one frame is stored in the frame memory 18, a control circuit 52 detects it and controls the drive circuit 51 so that the switch 46 is switched to the side of the contact a. A similar operation is repeated to store only the marking image data in the frame memory 18.

When a sampling circuit section 53 including the sampling circuit 43 is connected to the above-mentioned circuit, a plurality of image data pieces are stored in a frame memory 18A and a plurality of images may be displayed simultaneously on a monitor 19A. Since the mode of operation of the sampling circuit section 53 is the same as that of the embodiment shown in FIG. 13, a description thereof will be omitted.

FIG. 18 shows a case wherein both marked and non-marked images are displayed, and the marked image is indicated by a mark. The marked and non-marked image data are supplied to a monitor 19 and displayed as images. When a mark signal discrimination circuit 36 detects a mark signal of marked image data, it supplies the mark signal to a mark display section 54. The mark display section 54 displays the mark signal in the form of a mark, for example, characters "attention".

With this marking display operation, the degree of importance of images and the like can be indicated with non-marked images, providing an effective educational benefit.

In an embodiment shown in FIG. 19, in response to a mark signal detection signal from a mark signal discrimination circuit 36, a word insertion circuit 55 is actuated to generate characters, e.g., data "attention". The character data is stored in an empty area of a frame memory 18. The character data is read out from the frame memory 18 together with the image data and is supplied to a monitor 19. The word "attention" is displayed on the monitor 19 together with an image.

As described above, according to the present invention, a marked image is produced as image data so that discrimination/sorting of images is facilitated, and image diagnosis can be effectively performed.

What is claimed is:

1. An image marking apparatus comprising:
   image signal producing means for generating a plurality of displayable image signals corresponding, respectively, to a plurality of optical images;
   means for selectively generating a marking indication signal when an optical image requiring a marking is found, said marking indication signal being the same for all optical images for which marking is required;
   memory means for recording the image signals; and
   marking means for, in response to the marking indication signal, providing a displayable mark signal to said memory means to append the displayable mark signal to displayable image signals corresponding to said optical image requiring a marking.

2. An apparatus according to claim 1, wherein said marking means comprises means for generating a white level signal and transfer means for transferring the white level signal to said memory means as the mark signal in response to the marking indication signal.

3. An apparatus according to claim 2, wherein said marking means comprises switching means connected to said image signal producing means and said white level signal generating means for connecting said white level signal generating means to said memory means in response to the marking indication signal.

4. An apparatus according to claim 1, wherein said image signal producing means comprises image pick-up means for continuously generating the displayable image signals, and release means for selectively supplying the displayable image signals from said image pick-up means to said memory means in units of frames; and said marking indication signal generating means comprises means for generating the marking indication signal in response to actuation of said release means.

5. An apparatus according to claim 4, wherein said release means comprises a release switch having an arbitrarily selectable actuation period thereof, and pulse generating means coupled to the memory means for generating a pulse signal of a pulse width corresponding to one frame in response to actuation of said release switch; and said marking indication signal generating means comprises timer means actuated in response to a start of the actuation period of said release switch, and means for generating the marking indication signal when the arbitrarily selectable actuation period of said release switch exceeds a preset time of said timer means.

6. An apparatus according to claim 1, wherein said memory means comprises a recording disk having a directory track and a plurality of recording tracks storing the displayable image signals; said image signal producing means comprises track number designating means for designating a track number of the recording disk and image reproducing means for reproducing the displayable image signals corresponding to the designated track number of said recording disk; and said marking means comprises means responsive to the marking indication signal for storing the displayable mark signal in the directory track of said recording disk corresponding to the recording track number designated by said track number designating means.

7. An apparatus according to claim 1, wherein said memory means comprises a recording disk having a directory track and a plurality of recording tracks storing the displayable image signals; said image signal producing means comprises image number designating means for designating an image number of displayable image signals recorded in said recording disk and image reproducing means for reproducing the displayable image signals corresponding to the designated image number from said recording disk; and said marking means comprises buffer memory means responsive to the marking indication signal for storing together with the displayable mark signal the reproduced image designated by said image number designating means, and means for transferring the displayable mark signal to said recording disk.

8. An apparatus according to claim 1, wherein said memory means comprises small-and large-capacity memory means for storing the displayable image signals; said image signal producing means comprises image reproducing means for reproducing the displayable image signals stored in said small-capacity recording means therefrom; and said marking means comprises means responsive to the marking indication signal for storing the reproduced signal from said small-capacity memory means in said large-capacity memory means together with the mark signal.

9. An image marking apparatus according to claim 1, further comprising:
image reproducing means for reproducing said plurality of displayable image signals and said displayable mark signal; and
marked image control means coupled to the image reproducing means for reproducing only the displayable image signals and appended displayable mark reproducing means which correspond to said optical image requiring a marking.

10. An apparatus according to claim 9, wherein said marked image control means comprises means for detecting the mark signal and image generating means for generating image signals corresponding to the mark signal in response to a mark detection signal from said mark signal detecting means.

11. An apparatus according to claim 10, wherein said mark signal detecting means includes counting means for counting the mark signal; and said image generating means comprises buffer memory means for storing a plurality of displayable image signals generated in response to the mark detection signal, and means for sampling the image signals of said buffer memory means in accordance with a count of said counting means and for outputting the image signals of a number corresponding to the count of said counting means as a 1-frame image.

12. An apparatus according to claim 9, wherein said marked image control means comprises mark detecting means and image outputting means, said mark detecting means comprising means for converting the mark signal recorded by low-frequency multiplexing on the image signals into a mark voltage signal, and pulse generating means for generating a pulse having a pulse width corresponding to one frame in response to the mark voltage signal, and said image outputting means having means for outputting an image signal corresponding to the mark signal in response to an output pulse from said pulse generating means.

13. An apparatus according to claim 12, wherein said mark signal detecting means includes counting means for counting the mark signal; and said image outputting means comprises buffer memory means for storing a plurality of image signals output in response to the mark detection signal, and means for sampling the image signals of said buffer memory means in accordance with a count of said counting means and for outputting the image data of a number corresponding to the count of said counting means as a 1-frame image.

14. An apparatus according to claim 9, wherein said image reproducing means comprises means for reproducing the mark signal and image number data from a directory track of a recording disk and for reproducing the image signals from a recording track; said mark signal detecting means comprises discriminating means for producing an image number signal when the mark signal is discriminated from a reproduced signal from said reproducing means; and said image reproducing means comprises means for reproducing the image signals from a recording track corresponding to the image number discriminated in response to an output from said discriminating means, and means for transferring the reproduced image data signals to said frame memory.

15. An apparatus according to claim 9, wherein said image reproducing means comprises display means for displaying the image signals together with the mark signal.

16. An apparatus according to claim 9, wherein said image reproducing means comprises character generating means for generating character signals in response to the mark signal and display means for displaying the characters.

17. An image apparatus for selectively marking a plurality of image data stored in an image data recording means, said image data having optical image display data and displayable mark data, and said displayable mark data being associated with only selected ones of said optical image display data, comprising;
   means for detecting the displayable mark data;
   image reproducing means for retrieving a plurality of image data from said recording means; and
   marked image data generating means responsive to the image reproducing means and the detecting means for generating to a display output means only the image data corresponding to the selected ones of the optical image display data that are associated with said displayable mark data.

18. An apparatus according to claim 17, wherein said image data generating means comprises means for detecting the mark data to provide a mark detection signal, and said output means comprises means for displayable the image data including the mark data in response to the mark detection signal.

19. A method of marking selected images to facilitate visually identifying such images from a plurality of images, comprising the steps of:
   producing a plurality of electrically displayable images corresponding, respectively, to a plurality of optical images;
   displaying said plurality of electrically displayable images;
   selecting at least one of said plurality of electrically displayable images;
   generating a marking indication signal that is the same for all of the at least one of the plurality of electrically displayable images which have been selected;
   storing the selected at least one image and the marking indication signal so as to be associated with each other; and
   displaying the selected at least one image with an image representative of the marking indication signal;
   whereby the selected at least one image can be visually identified from the plurality of electrically displayable images by an image representative of the marking indication signal displayed in associated with the at least one image.

20. A method of marking selected images to facilitate visually identifying such images from a plurality of images, comprising the steps of:
   producing a plurality of electrically displayable images corresponding, respectively, to a plurality of optical images;
   displaying said plurality of electrically displayable images;
   selecting at least one of said plurality of electrically displayable images;
   generating a marking indication signal that is the same for all of the at least one of the plurality of electrically displayable images which have been selected;
   storing the selected at least one image and the marking indication signal so as to be associated with each other; and
   generating to a display output means only the selected at least one image stored in association with the marking indication signal.

* * * * *